No. 814,656. PATENTED MAR. 6, 1906.
C. LOUGHREY.
HORSE BLANKET.
APPLICATION FILED JUNE 27, 1904.
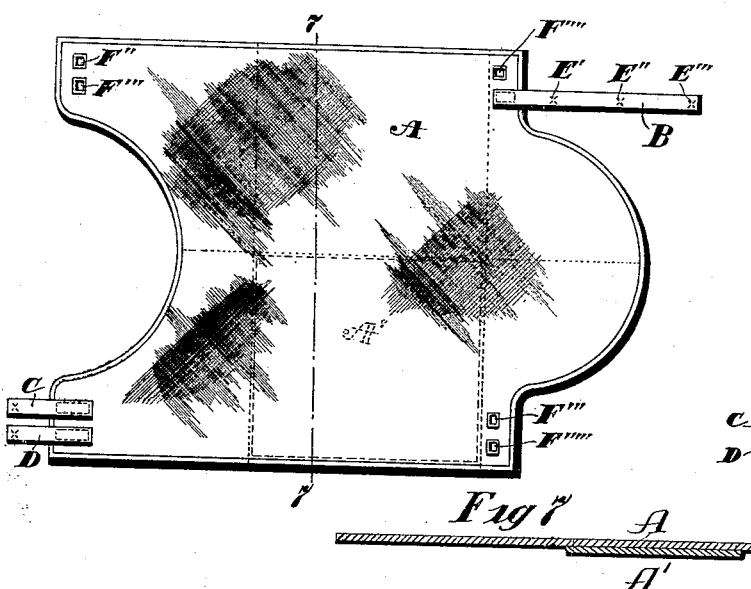
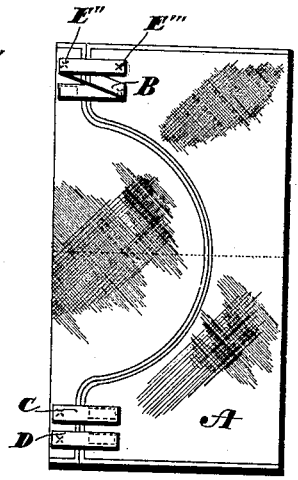
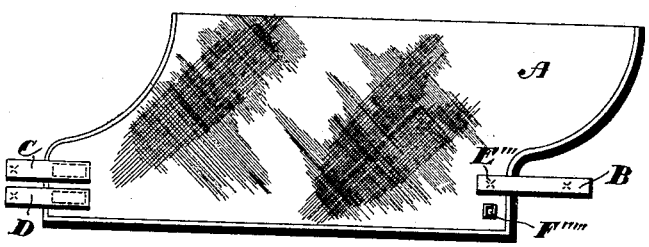
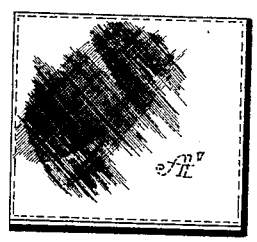
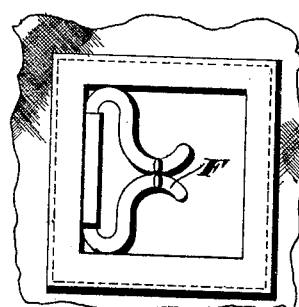

UNITED STATES PATENT OFFICE.

CARL LOUGHREY, OF LOS ANGELES, CALIFORNIA.

HORSE-BLANKET.

No. 814,656.  Specification of Letters Patent.  Patented March 6, 1906.

Application filed June 27, 1904. Serial No. 214,416.

*To all whom it may concern:*

Be it known that I, CARL LOUGHREY, a citizen of the United States, residing at Los Angeles, in the county of Los Angeles and State of California, have invented new and useful Improvements in Horse-Blankets, of which the following is a specification.

My invention relates to means whereby one blanket may be made to serve the purpose of two different blankets—that is to say, I have provided a combination-blanket adapted for use in covering a horse which can be readily folded into shape for use as a saddle-blanket; and the object of my invention is to provide a handy and reliable blanket that can be used with facility for both said purposes. I accomplish this object by means of the device described herein and shown in the accompanying drawings, in which—

Figure 1 is a plan view of my combination-blanket spread out. Fig. 2 is a view of my blanket in its partly-folded position. Fig. 3 is a view of my blanket folded into a square, exposing on its upper surface the waterproof portion thereof, in which position it is adapted for use as a saddle-blanket. Fig. 4 is a view of my blanket in the position in which it is used when on the animal. Figs. 5 and 6 represent devices by which the different parts of the blanket are secured together. Fig. 7 is a sectional view showing the waterproof pad attached to the blanket.

In the drawings, A represents my combination-blanket made into the form and shape shown in Fig. 1 and having secured thereto the attaching-straps B, C, and D, by means of which the blanket is held in place when on the animal, the straps C and D being adapted for securing the blanket at the breast of the animal and the strap B passing around the rear of the animal. The strap C, carrying a hook E, is secured to the loop F', and the strap D, carrying a like hook, is secured to the loop F''. On the hind strap B, I have placed three hooks E', E'', and E'''. When the blanket is in place on the animal, the hook E''' is secured to the loop F'''. These loops are placed on the side of the strap (not shown) at points on the straps indicated by an X.

When the blanket is folded into the shape of a parallelogram, as shown in Fig. 2, the respective hooks will dispose themselves as shown therein. The hook E''' being adapted for hooking to the loop F'', the strap C and D being adapted to be hooked by the hooks thereon to the loops F'''' and F''''', the hook E and the hook F being adapted to fit snugly together and avoid producing the usual bulky effect produced by a buckle, when the blanket is folded in shape for use as a saddle-blanket, as shown in Fig. 3, the exposed face thereof, A' (shown in dotted lines surrounding the same in Fig. 1) has a waterproof facing on the reverse side of this portion of the blanket. It is covered by a waterproof pad, the outlines thereof being indicated in dotted lines, and when the blanket is in use as a saddle-blanket the waterproof portion thereof will be placed next to the animal except as to the portion of the blanket to which pad is sewed. This will prevent perspiration passing into the balance of the blanket and keep the blanket dry.

Having described my invention, what I claim as new, and desire to secure by Letters Patent, is—

1. As an article of manufacture, a horse-blanket the forward end of which is recessed to receive and fit the neck and the rear end projecting correspondingly so that the ends when folded and brought together and superimposed upon the middle of the blanket fit each other and produce a saddle-blanket of uniform thickness throughout.

2. As an article of manufacture, a horse-blanket having a portion only of its surface waterproof, said waterproof portion folded outside when the article is used as a saddle-blanket, thereby preventing the passage of moisture to any other parts of the folded blanket.

3. As an article of manufacture, a horse-blanket the ends of which are adapted to engage each other throughout the width of the blanket when folded upon the center, whereby there are two thicknesses throughout, one-half of the center fold being waterproof, a second fold in the blanket bringing the waterproof section outermost, whereby moisture is prevented from passing to the remaining folds of the blanket.

In witness that I claim the foregoing I have hereunto subscribed my name this 18th day of June, 1904.

CARL LOUGHREY.

Witnesses:
HENRY T. HAZARD,
G. E. HARPHAM.